(12) United States Patent
Lee

(10) Patent No.: US 11,077,737 B2
(45) Date of Patent: Aug. 3, 2021

(54) BLOWER UNIT OF AIR CONDITIONER FOR VEHICLE

(71) Applicant: Hanon Systems, Daejeon (KR)

(72) Inventor: Seung Ho Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 259 days.

(21) Appl. No.: 16/380,673

(22) Filed: Apr. 10, 2019

(65) Prior Publication Data

US 2019/0315196 A1    Oct. 17, 2019

(30) Foreign Application Priority Data

Apr. 11, 2018  (KR) .................. 10-2018-0041941
Apr. 2, 2019   (KR) .................. 10-2019-0038165

(51) Int. Cl.
  *B60H 1/24*  (2006.01)
  *B60H 1/26*  (2006.01)
  *B60H 1/00*  (2006.01)

(52) U.S. Cl.
  CPC ......... *B60H 1/241* (2013.01); *B60H 1/00028* (2013.01); *B60H 1/26* (2013.01); *B60H 1/00528* (2013.01); *B60H 2001/00092* (2013.01)

(58) Field of Classification Search
  CPC ...... B60H 1/241; B60H 1/26; B60H 1/00028; B60H 1/00849; B60H 1/00857

USPC .................. 454/139, 141–143, 145, 152
See application file for complete search history.

(56) References Cited

U.S. PATENT DOCUMENTS

2015/0017899 A1* 1/2015 Kim ............... B60H 1/00785
                                                      454/75
2016/0144688 A1* 5/2016 Kim ............... B60H 1/00564
                                                      454/139

FOREIGN PATENT DOCUMENTS

DE    69606726 T2    6/2000
DE    102010046314 A1  3/2012
DE    102011052599 A1  5/2012
KR    2011-0136257 A   12/2011

* cited by examiner

*Primary Examiner* — Vivek K Shirsat
*Assistant Examiner* — Ko-Wei Lin
(74) *Attorney, Agent, or Firm* — Norton Rose Fulbright US LLP; James R. Crawford

(57) ABSTRACT

A blower unit of an air conditioner for a vehicle which allows one actuator to drive two doors in a structure in which at least two doors are provided in an intake duct is disclosed. The blower unit of an air conditioner for a vehicle includes an intake duct including an internal air inlet through which internal air is introduced and an external air inlet through which external air is introduced, a first door configured to adjust an opening amount of a part of the external air inlet and an opening amount of the internal air inlet, and a second door configured to adjust an opening amount of the remaining part of the external air inlet, wherein the first door and the second door are linked and driven together.

13 Claims, 20 Drawing Sheets

BLOWER UNIT OF AIR CONDITIONER FOR VEHICLE

This application claims priority from Korean Patent Application No. 10-2018-0041941, filed Apr. 11, 2018, and Korean Patent Application No. 10-2019-0038165, filed Apr. 2, 2019. The entire contents of these applications are incorporated herein by reference in their entirety.

TECHNICAL FIELD

The present invention relates to a blower unit of an air conditioner for a vehicle, and more specifically, to a blower unit of an air conditioner for a vehicle which selectively transfers internal air or external air to the inside of an air conditioner case of a vehicle.

BACKGROUND ART

Generally, an air conditioner for a vehicle is a device that heats or cools the inside of vehicle by heating or cooling external air introduced into the inside of a vehicle or indoor air being circulated. The air conditioner for a vehicle includes a blower unit which blows internal or external air to the inside of an air conditioner case, an evaporator formed in the air conditioner case to perform cooling action, a heater core which performs heating action, and the like, and selectively blows air, which is cooled or heated by the evaporator and the heater core, into each part of the inside of the vehicle.

A blower unit for a vehicle that partially introduces internal air even in an external air mode by using an auxiliary door that opens or closes an internal air inlet is disclosed in pre-filed Korean Laid-open Patent Application No. 10-2011-0136257 (Dec. 21, 2011). FIG. 1 is a cross-sectional view illustrating the inside of a blower unit of a conventional air conditioner for a vehicle.

As shown in FIG. 1, the conventional blower unit of an air conditioner for a vehicle includes a blower case 1. The blower case 1 includes an internal air inlet 11 through which internal air is introduced and an external air inlet 12 through which external air is introduced. The blower case 1 includes an outlet, through which internal air and external air introduced through the internal air inlet 11 and the external air inlet 12 are introduced, and a blowing fan 23 formed therein.

An intake duct 10 and a scroll case 20 are vertically assembled to form the blower case 1. The intake duct 10 includes the internal air inlet 11 and the external air inlet 12, which are formed in an upper portion thereof, has an open lower portion, and includes an internal and external air converting door 15 rotatably mounted therein to open or close the internal and external air inlets 11 and 12. The scroll case 20 is coupled to the open lower portion of the intake duct 10, and the outlet is formed and extends on one side of the scroll case 20 and is coupled with an inlet side of an air conditioner case.

The blowing fan 23 for blowing the internal and external air, which is introduced into the intake duct 10, to an inlet of the air conditioner case is rotatably mounted in the scroll case 20. The scroll case 20 is provided with the air filter 30 for filtering foreign materials from the air being introduced into the blower case 1. A motor 24 that drives the blowing fan 23 is provided on a lower portion of the scroll case 20.

The blower case 1 includes an auxiliary internal air inlet 36 formed at an upstream side of the blowing fan 23 in an air flow direction. The blower case 1 includes an auxiliary internal air door 40. The auxiliary internal air door 40 is provided in the blower case 1, has one side coupled to an upper portion of the internal air inlet 36, and is elastically bent so as to open or close the internal air inlet 36. The internal air inlet 36 allows the internal air to be partially introduced into the blower case 1 in an external air mode.

In the above-described blower unit, in an internal air mode, the internal and external air converting door 15 opens the internal air inlet 11 and closes the external air inlet 12. The internal air introduced through the internal air inlet 11 by operation of the blowing fan 23 passes through the air filter 30, is introduced into the blowing fan 23, and is discharged in a radial direction, and the discharged internal air moves along the inside of the scroll case 20 and is discharged toward the air conditioner case.

Further, in an external air mode, the internal and external air converting door 15 closes the internal air inlet 11 and opens the external air inlet 12. The external air introduced through the external air inlet 12 by operation of the blowing fan 23 passes through the air filter 30, is introduced into the blowing fan 23, and is discharged in the radial direction, and the discharged external air moves along the inside of the scroll case 20 and is discharged toward the air conditioner case. The auxiliary internal air door 40 opens the internal air inlet 36 due to a negative pressure generated in the intake duct 10 when the blowing fan 23 is rotated.

The conventional blower unit of an air conditioner for a vehicle has problems. When the blower unit has one door, it is difficult to operate various internal and external air inflow modes, and when the blower unit has two doors, the number of operational parts, such as an actuator, for driving the doors increases. Further, the conventional blower unit of an air conditioner for a vehicle should have a complicated operational structure to operate various internal and external air inflow modes.

(Patent Document 1) Patent Document 1: Korean Laid-open Patent Application No. 10-2011-0136257 (Dec. 21, 2011)

Technical Problem

The present invention is directed to providing a blower unit of an air conditioner for a vehicle which allows one actuator to drive two doors in a structure in which at least two doors are provided in an intake duct.

Objectives of the present invention are not limited to the above-mentioned objects. Other objectives that are not mentioned may be clearly understood by those skilled in the art to which the present invention pertains from the following description.

Technical Solution

One aspect of the present invention provides a blower unit of an air conditioner for a vehicle which includes an intake duct including an internal air inlet through which internal air is introduced and an external air inlet through which external air is introduced, the blower unit including a first door configured to adjust an opening amount of a part of the external air inlet and an opening amount of the internal air inlet and a second door configured to adjust the opening amount of the remaining part of the external air inlet, wherein the first door and the second door are linked and driven together.

The blower unit may include a cam configured to drive the first door linked with the second door.

The cam may include a first slot configured to guide a pin of a first arm connected to a rotating shaft of the first door in a sliding manner and a second slot configured to guide a pin of a second arm connected to a rotating shaft of the second door in a sliding manner.

At least one of the first slot and the second slot may be divided into an idling section and a driving section.

The first slot may include a driving section of the first door and an idling section of the first door, and the second slot may include an idling section of the second door and a driving section of the second door.

In the driving section of the first door, the first door may form an on-off section in which the internal air inlet and the external air inlet are opened or closed.

In the driving section of the second door, the second door may form a multistage adjustment section in which the external air inlet is opened or closed in stages.

The idling section of the first door and the idling section of the second door may be disposed adjacent to each other, and the driving section of the first door and the driving section of the second door may be disposed farthest apart from each other.

The driving section of the first door and the idling section of the second door may be linked and driven together, and the idling section of the first door and the driving section of the second door may be linked and driven together.

The first slot and the second slot may extend along a perimeter of an edge of the cam, and the driving section of the first door, the idling section of the first door, the idling section of the second door, and the driving section of the second door may be sequentially disposed.

Curved sections in which curvatures are changed may be formed on a boundary between the driving section of the first door and the idling section of the first door and on a boundary between the idling section of the second door and the driving section of the second door.

Another aspect of the present invention provides a blower unit of an air conditioner for a vehicle which includes an intake duct including an internal air inlet through which internal air is introduced and an external air inlet through which internal air is introduced, the blower unit including a first door configured to adjust an opening amount of a part of the external air inlet and an opening amount of the internal air inlet, and a second door configured to adjust an opening amount of the remaining part of the external air inlet, wherein the first door is on-off adjusted to open a part of the external air inlet and an entirety of the internal air inlet, and the second door is adjusted to open the remaining part of the external air inlet in stages.

Still another aspect of the present invention provides a blower unit of an air conditioner for a vehicle which includes an intake duct including a first internal air inlet and a second internal air inlet through which internal air is introduced and an external air inlet through which external air is introduced, the blower unit including a first door configured to adjust an opening amount of a part of the external air inlet and an opening amount of the first internal air inlet, and a second door configured to adjust an opening amount of the remaining part of the external air inlet and an opening amount of the second internal air inlet, wherein the first door and the second door are linked and driven together.

The blower unit may include a cam configured to drive the first door linked with the second door, a first slot configured to guide a pin of a first arm connected to a rotating shaft of the first door in a sliding manner, and a second slot configured to guide a pin of a second arm connected to a rotating shaft of the second door in a sliding manner.

The first slot may be divided into a driving section and an idling section of the first door, and the second slot may be divided into an idling section and a driving section of the second door.

Curvatures may be changed on a boundary between the driving section and the idling section of the first slot and on a boundary between the idling section and the driving section of the second slot.

An amount of change in curvature of a rotation section of the first slot may be different from an amount of change in curvature of a rotation section of the second slot.

A curvature of the idling section of the first slot may be less than a curvature of the idling section of the second door.

When the cam rotates, the first door and the second door may be linked and rotated together, and the first door and the second door may open or close the first internal air inlet, the second internal air inlet, and the external air inlet to switch among an internal air mode, a semi-external air mode, and an external air mode.

Advantageous Effects

A blower unit of an air conditioner for a vehicle according to the present invention drives two doors using one actuator to reduce the number of components including the actuator so as to reduce manufacturing costs and a load and has an optimized structure and arrangement of a cam and a slot so as to efficiently perform adjustment and linking and driving of two doors.

Various useful advantages and effects of the present invention are not limited to the above-described descriptions and may be much easier understood in the descriptions of the exemplary embodiments.

MODES OF THE INVENTION

Figure 1:
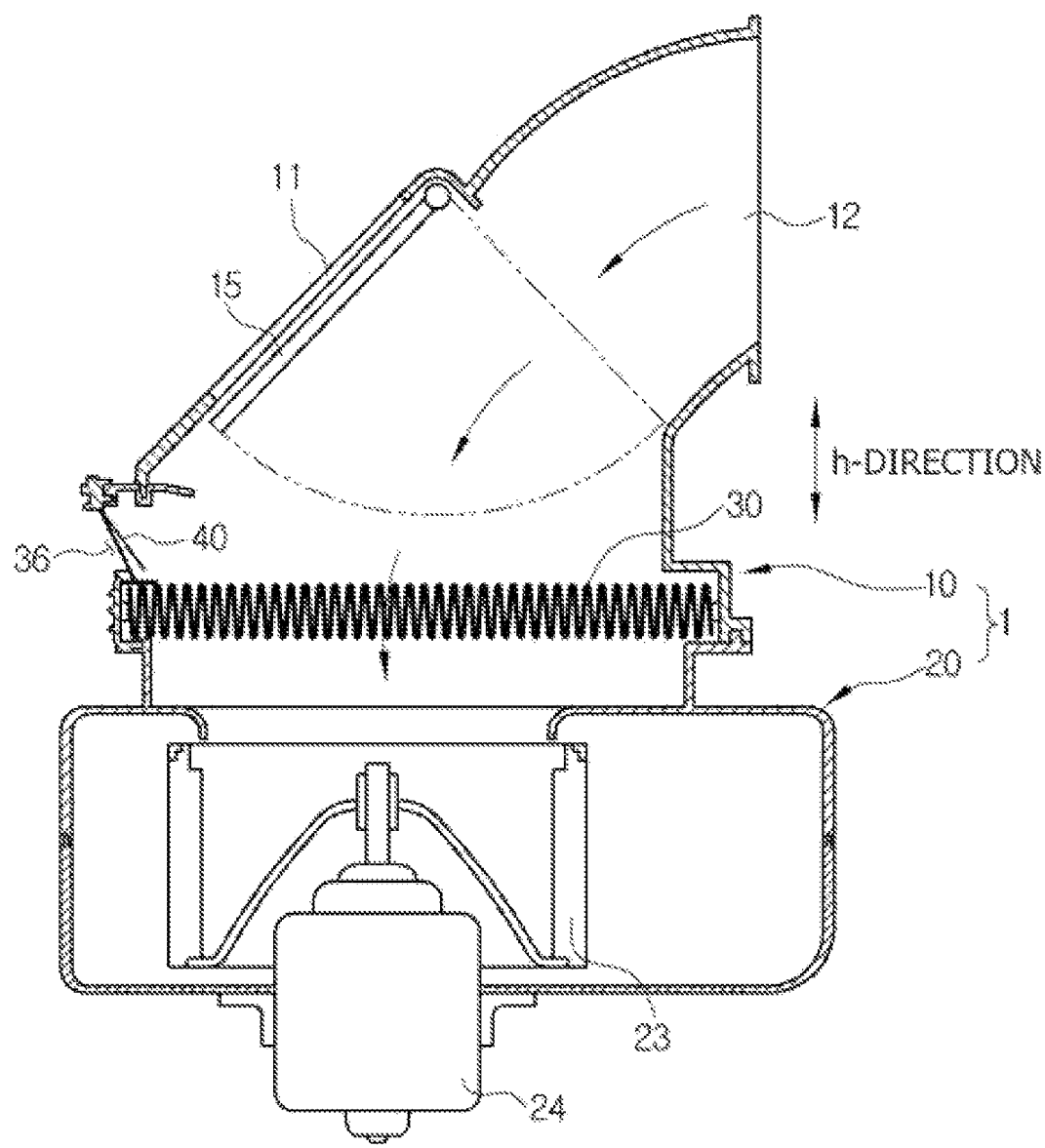
FIG. 1 is a cross-sectional view illustrating the inside of a conventional blower unit of an air conditioner for a vehicle.

Hereinafter, exemplary embodiments of the present invention will be described in detail with reference to the accompanying drawings.

However, the embodiments of the present invention are not limited to embodiments described herein and may be implemented in several different forms. At least one of the elements of the embodiments may be selectively combined and substituted.

Further, unless clearly and particularly defined, terms used in the embodiments of the present invention (including technical and scientific terms) will be generally interpreted by those skilled in the art, and general terms, such as terms defined in dictionaries, may be interpreted by considering contextual meaning of the related art.

Therefore, the terms used in the exemplary embodiments of the present invention are for purposes of description and not for limitation.

In this specification, singular forms may include plural forms unless defined otherwise herein and, when described as "at least one (or one or more) of A, B, and C", it may be interpreted as at least one of all possible combinations of A, B, and C.

Further, in the descriptions of elements of the embodiments of the present invention, terms, such as the first, the second, A, B, (a), (b), and the like, may be used.

The terms are only used to distinguish one element from another, and the characteristics, order, sequence, and the like of the elements are not limited by the terms.

Further, when any element is referred to as being "connected to" or "coupled to" another element, it may be connected directly to or coupled directly to another element or may be also connected to or coupled to another element through still another element intervening therebetween.

When any element is referred to as being formed or positioned "on (above)" or "under (below)" another element, the two elements may be directly connected, or one or more other elements may be formed or disposed between the two elements. Further, when described as "on (above)" or "under (below)", it may be interpreted as an upward direction or a downward direction with respect to one element.

Hereinafter, exemplary embodiments of the present invention will be described in detail with reference to the accompanying drawings, and the same or similar elements are designated with the same numeral references regardless of the numerals in the drawings, and redundant description thereof will be omitted.

FIGS. 2 to 20 clearly illustrate only main features to conceptually and clearly understand embodiments of the present invention. As a result, various variations of the illustration are expected, and the scope of the present invention may not be limited by specific shapes shown in the drawings.

Figure 2:
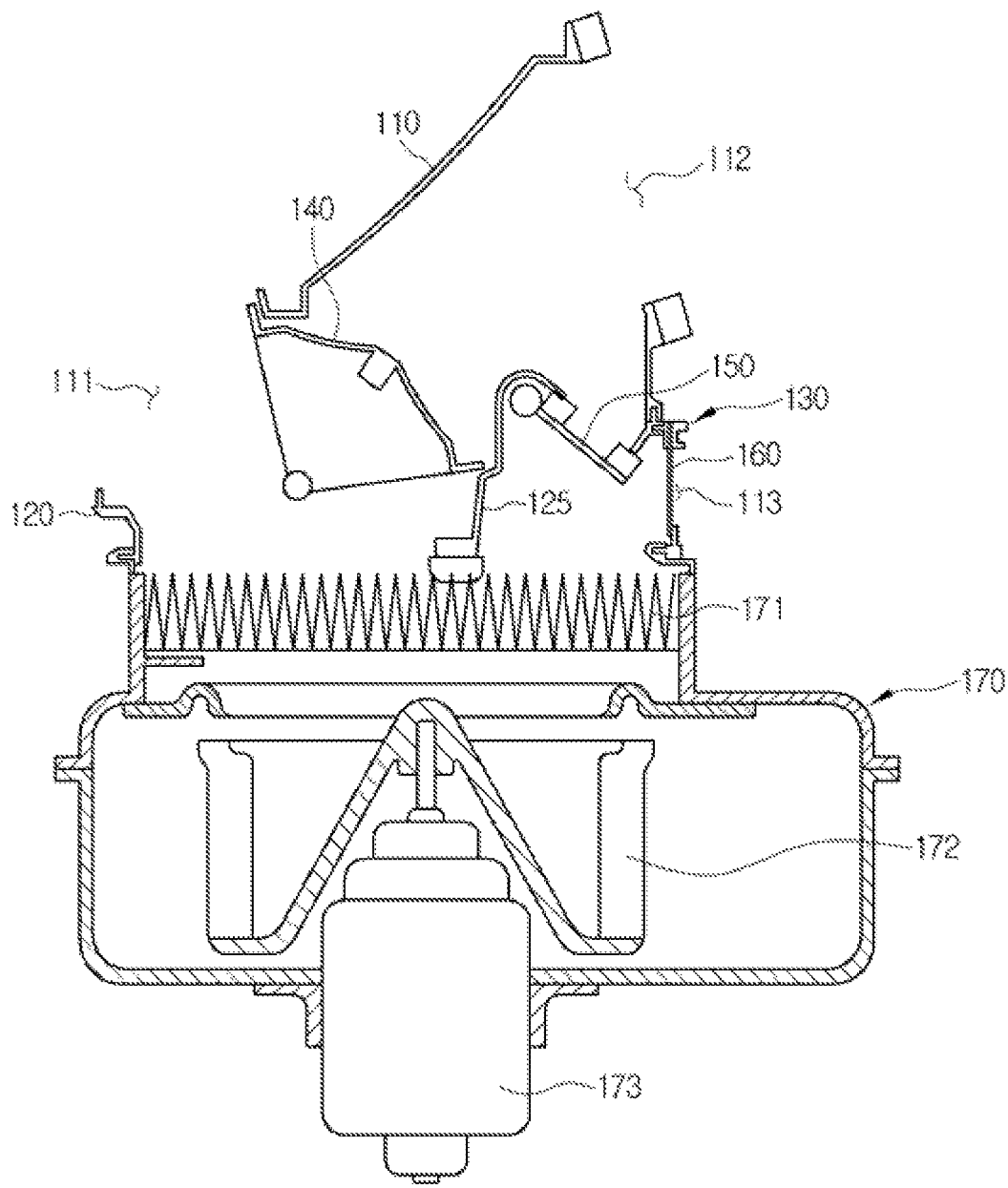
FIG. 2 is a cross-sectional view illustrating the inside of a blower unit of an air conditioner for a vehicle according to one embodiment of the present invention.
Figure 3:
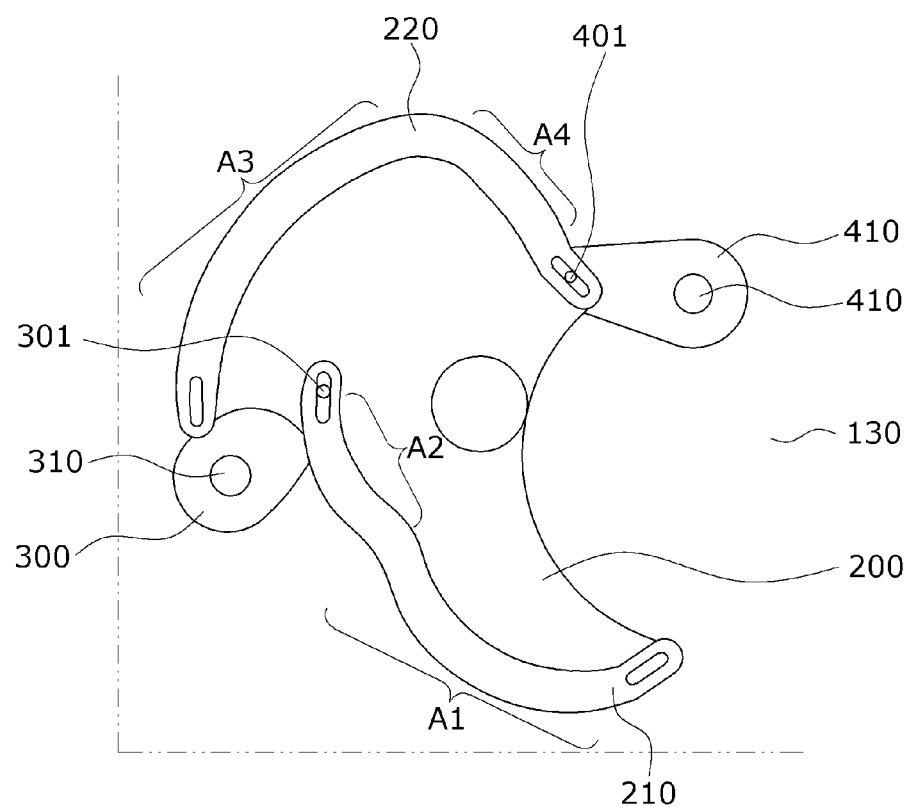
FIGS. 3 and 4 are front views illustrating a cam according to one embodiment of the present invention.
Figure 4:
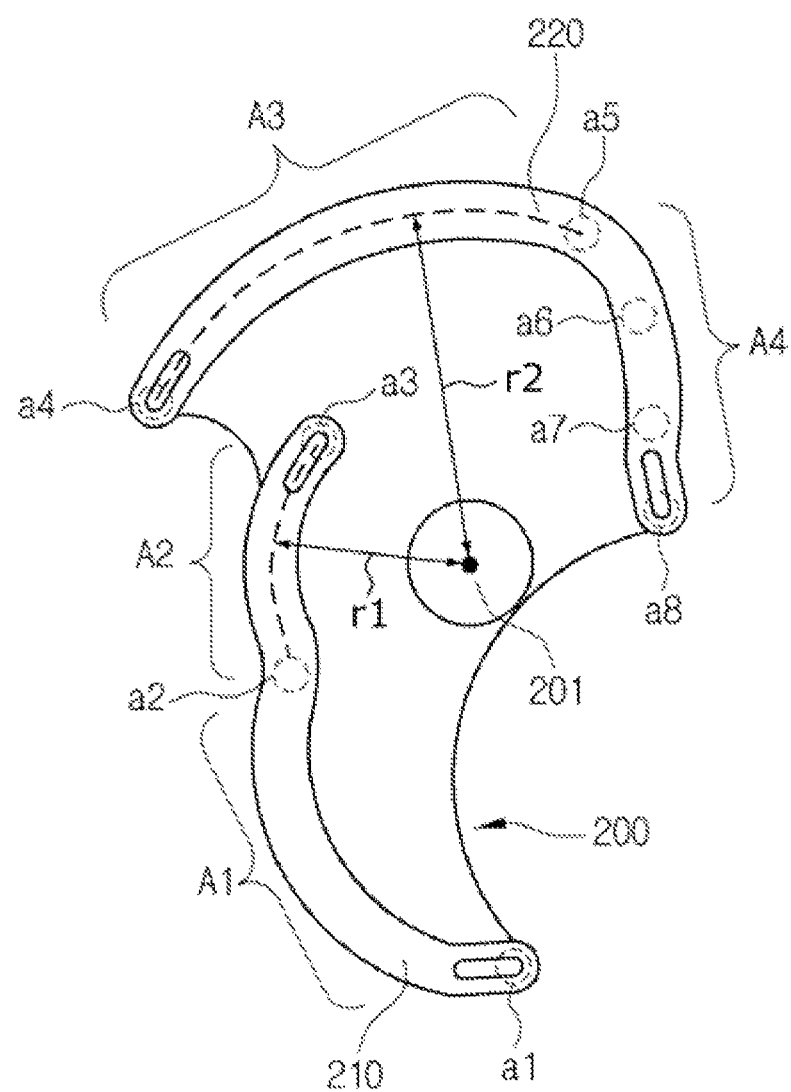
Figure 5:
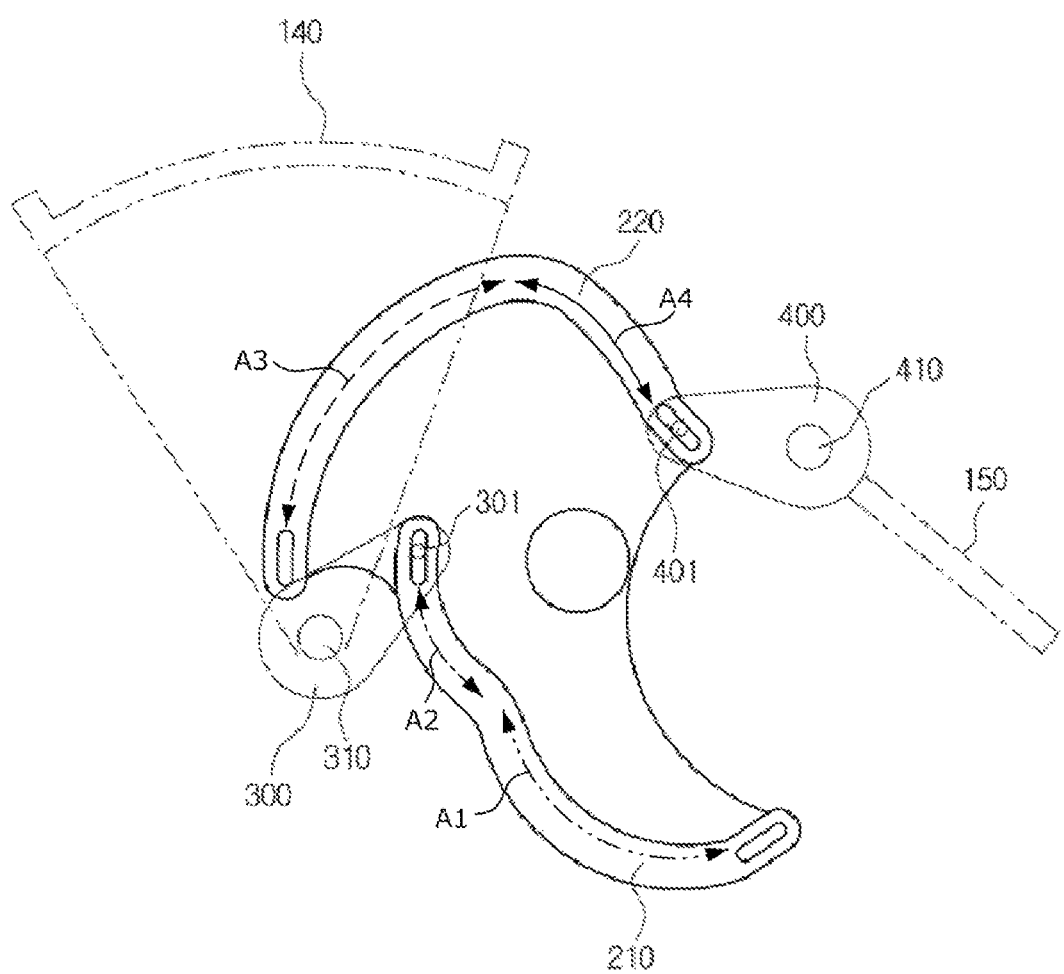
FIGS. 5 to 7 are views illustrating operation of the cam according to one embodiment of the present invention.
Figure 6:
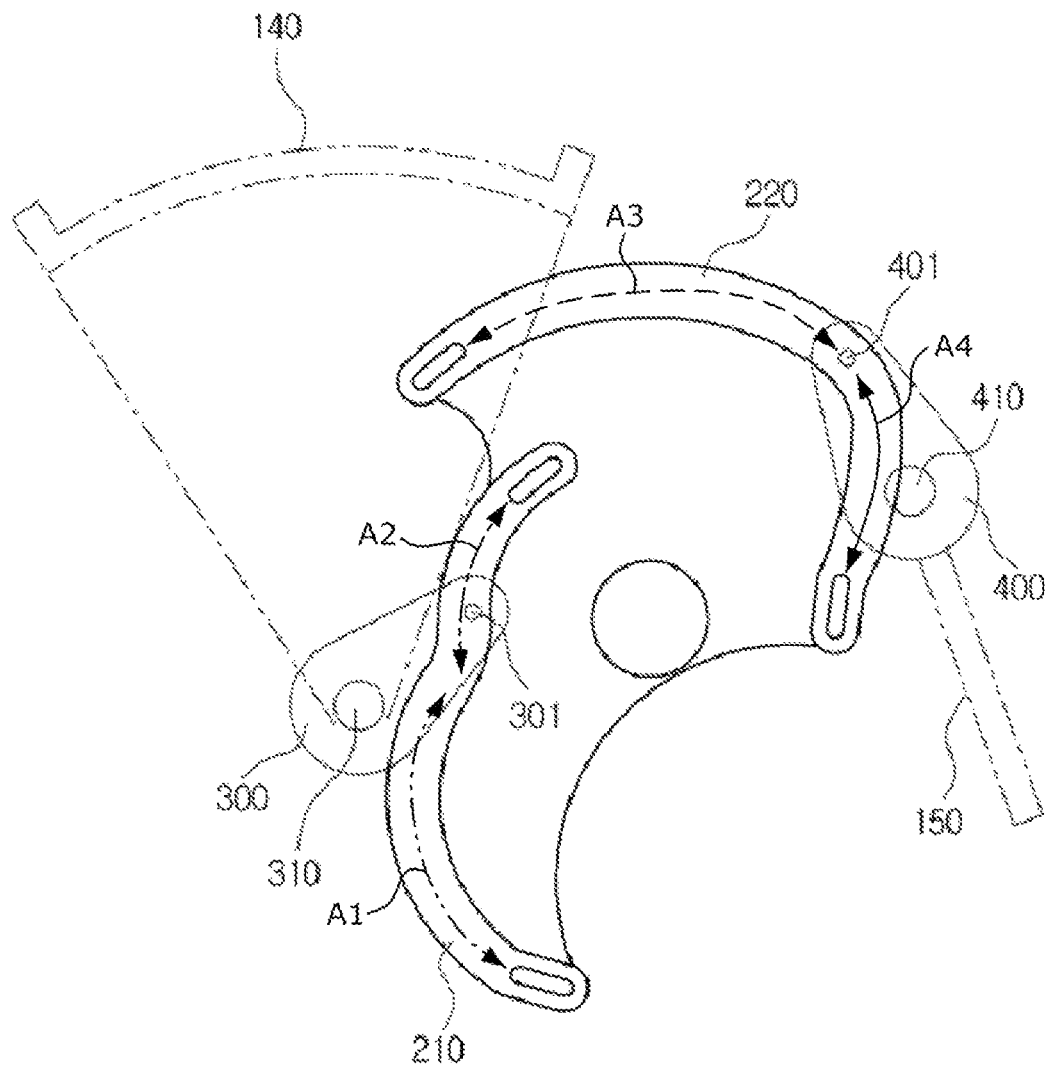
Figure 7:
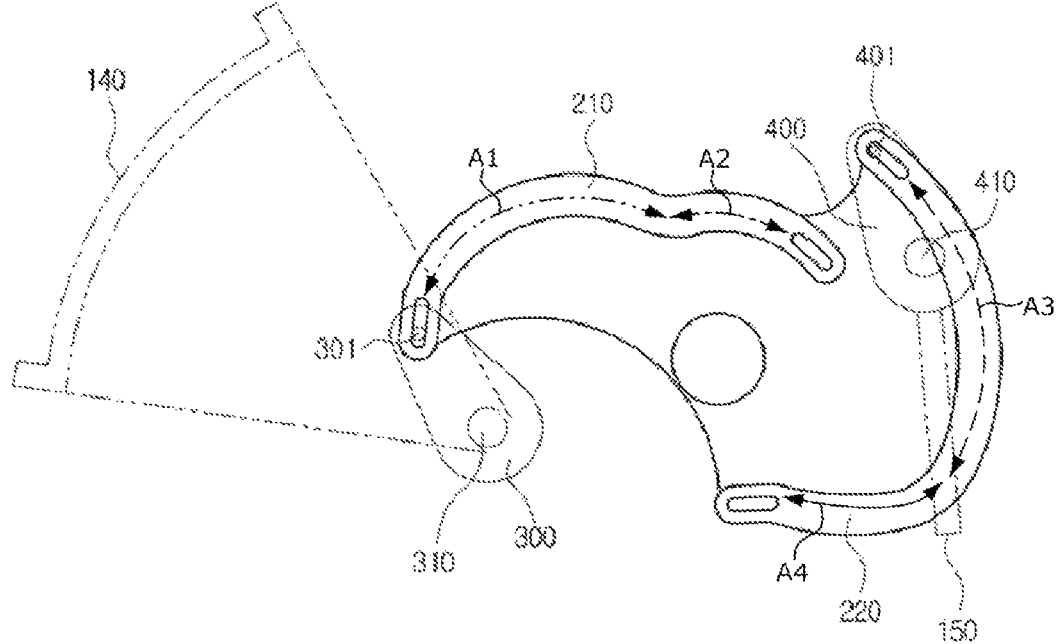

FIG. 2 is a cross-sectional view illustrating the inside of a blower unit of an air conditioner for a vehicle according to one embodiment of the present invention, FIGS. 3 and 4 are front views illustrating a cam according to one embodiment of the present invention, and FIGS. 5 to 7 are views illustrating operation of the cam according to one embodiment of the present invention.

As shown in FIGS. 2 to 7, the blower unit of an air conditioner for a vehicle according to one embodiment of the present invention includes an intake duct 130, a first door 140, a second door 150, a third door 160, a blower case 170, an air filter 171, a blower wheel 172, and a blower motor 173.

The blower case 170 is coupled to a lower portion of the intake duct 130, and the air filter 171, the blower wheel 172, and the blower motor 173 are formed in the blower case 170. The air filter 171 filters foreign materials from air that passes therethrough. The blower wheel 172 is positioned under the air filter 171 and is coupled to a driving shaft of the blower motor 173. When the blower wheel 172 rotates, internal air or external air that is introduced through the intake duct 130 is moved to an air conditioner fora vehicle.

The intake duct 130 includes an internal air inlet 111 through which internal air is introduced and an external air inlet 112 through which external air is introduced. The intake duct 130 includes an upper case 110 and a lower case 120. The upper case 110 has a dome shape on the whole and is coupled to an upper portion of the lower case 120. The internal air inlet 111 is formed on one side of an upper surface of the upper case 110, and the external air inlet 112 is formed on the other side of the upper surface thereof.

The lower case 120 includes an assembly groove formed in an upper surface thereof to be assembled with the upper case 110 and generally has a roughly rectangular frame shape having open upper and lower portions. An auxiliary internal air inlet 113 through which internal air is introduced is formed on a lateral surface of the lower case 120.

The first door 140 adjusts an opening amount of a part of the external air inlet 112 and an opening amount of the internal air inlet 111. The second door 150 adjusts the opening amount of the remaining part of the external air inlet 112. The third door 160 adjusts the opening amount of the auxiliary internal air inlet 113.

The first door 140 is formed as a dome door type and may rotate to cover an entirety of the internal air inlet 111 and approximately half of the external air inlet 112. The second door 150 is formed as a flat door type and may rotate to cover the rest of the external air inlet 112 that is not covered by the first door 140.

A partition wall 125 is formed in the lower case 120. The partition wall 125 extends upward from an upper surface of the air filter 171. The partition wall 125 is disposed between the first door 140 and the second door 150 and at least partially separates an external air inflow path from an internal air inflow path. The partition wall 125 separates the external air inflow path from the internal air inflow path in a mode in which internal air and external air are simultaneously introduced so as to prevent backflow of the external air toward the inside through the internal air inlet due to an increase in driving speed of vehicle.

The partition wall 125 has a positive function of blocking backflow of external air toward the inside. However, in an internal air mode, since air does not flow to an external air inlet path divided by the partition wall 125, a part of the air filter 171 is not used, and the partition wall 125 has a negative function of a decrease in air volume. For example, as shown in FIG. 2, when the partition wall 125 is mounted at a point that is approximately 7:3 of the internal air inflow path to the external air inflow path, air flows to only 70% of the air filter 171 and does not flow to the other 30% thereof, thereby resulting in a decrease in overall air volume.

In order to solve the problem of the decrease of air volume caused by the partition wall 125, the auxiliary internal air inlet 113 and the third door 160 introduce internal air into the intake duct 130, apart from inflow of the internal air through the internal air inlet 111. The third door 160 is formed of a flexible material as a flat door type. The third door 160 has one end portion fixed to an upper portion of the auxiliary internal air inlet 113, is bent by a negative pressure, which is generated in the intake duct 130, in an external air mode to open the auxiliary internal air inlet 113, and thus the internal air is introduced into the intake duct 130.

The first door 140 and the second door 150 are linked and driven together. That is, the first door 140 and the second door 150 are mounted in the intake duct 130 to be individually rotatable and have one actuator, which is a power source, to simultaneously adjust the first door 140 and the second door 150. Therefore, as compared with a structure which individually drives the two doors, the number of components including the actuator of the above described structure is small, and thus manufacturing costs and a load can be reduced.

The intake duct 130 includes a cam 200 that drives the first door 140 linked with the second door 150. The cam 200 is mounted on the outside of the intake duct 130 to be rotatable about the rotating shaft 201, and the driving shaft of the actuator is connected with the rotating shaft 201 to rotate the cam 200. In the embodiment of the present invention, the actuator is described as an example of the power source that rotates the cam 200, but the present invention is not limited thereto and may be implemented in a manual type or a driving structure using another power source.

The cam 200 includes a first slot 210 and a second slot 220. The first slot 210 guides a pin 301 of a first arm 300 in a sliding manner. The first arm 300 is connected with the rotating shaft 310 of the first door 140. When the cam 200 rotates about the rotating shaft 201, the pin 301 of the first arm 300 slides along the first slot 210, the first arm 300 is rotated about the rotating shaft 310 of the first door 140, and the first door 140 is rotated.

The second slot 220 guides a pin 401 of a second arm 400 in a sliding manner. The second arm 400 is connected with a rotating shaft 410 of the second door 150. When the cam 200 rotates about the rotating shaft 201, the pin 401 of the second arm 400 slides along the second slot 220, the second arm 400 is rotated about the rotating shaft 410 of the second door 150, and the second door 150 is rotated.

At least one of the first slot 210 and the second slot 220 is divided into an idling section and a driving section. More specifically, the first slot 210 has a driving section A1 of the first door and an idling section A2 of the first door, and the second slot 220 has an idling section A3 of the second door and a driving section A4 of the second door.

In the driving section A1 of the first door, the first door 140 forms an on-off section in which the internal air inlet 111 and the external air inlet 112 are opened or closed. Further, in the driving section A4 of the second door, the second door 150 has a multistage adjustment section in which the external air inlet 112 is opened or closed in stages.

The idling section A2 of the first door and the idling section A3 of the second door are disposed adjacent to each other. Further, the driving section A1 of the first door and the driving section A4 of the second door are disposed farthest apart from each other. The driving section A1 of the first door and the idling section A3 of the second door are linked and driven together, and the idling section A2 of the first door and the driving section A4 of the second door are linked and driven together.

A curved section in which a curvature is changed is formed on a boundary between the driving section A1 of the first door and the idling section A2 of the first door and on a boundary between the idling section A3 of the second door and the driving section A4 of the second door.

Referring to FIG. 4, the curved section in which a curvature is changed is formed on a point a2 and a point a5. The driving section A1 of the first door is formed between a point a1 and the point a2, and the idling section A2 of the first door is formed between points the point a2 and a point a3. The idling section A3 of the second door is formed between a point a4 and a point a5, and the driving section A4 of the second door is formed between the point a5 and a point a8.

The driving section A4 of the second door is multistage-adjusted to allow the second door 150 to open a part of the external air inlet 112 in stages. In this section, curved sections in which curvatures are changed are formed on the points a5, a6, and a7, and the second door 150 is adjusted to be opened or closed in stages, and thus multistage adjustment of a door is effectively performed.

Referring to FIG. 5, the pin 301 of the first arm 300 is positioned on the point a3 of the first slot 210, and the first door 140 is in a state in which the first door 140 is maximally rotated in a clockwise direction, that is, a state in which a part of the external air inlet 112 is closed. The pin 401 of the second arm 400 is positioned on the point a8 of the second slot 220, and the second door 150 is in a state in which the second door 150 is maximally rotated in a counterclockwise direction, that is, a state in which the remaining part of the external air inlet 112 is closed.

Referring to FIG. 6, in the state of FIG. 5, when the cam 200 rotates about the rotating shaft 201 at a predetermined angle in a clockwise direction, the pin 301 of the first arm 300 slides along the first slot 210. In the section that is the idling section A2 of the first door, the first door 140 is not rotated. The pin 401 of the second arm 400 slides along the second slot 220. In the section that is the driving section A4 of the second door, the second door 150 is rotated in stages from the points a7 to a6 in a clockwise direction.

Referring to FIG. 7, from a state of FIG. 6, when the cam 200 rotates about the rotating shaft 201 in a clockwise direction, the pin 301 of the first arm 300 slides along the first slot 210. In the section that is a driving section A1 of the first door, the first door 140 is rotated in a counterclockwise direction to close the internal air inlet 111. The pin 401 of the second arm 400 slides along the second slot 220. In the section that is the idling section A3 of the second door, the second door 150 is not rotated.

Further, the first slot 210 and the second slot 220 extend along a perimeter of an edge of the cam 200, and the driving section A1 of the first door, the idling section A2 of the first door, the idling section A3 of the second door, and the driving section A4 of the second door are sequentially and consecutively disposed. Due to such a configuration, arrangement of the slots is optimized within a limited size range of the cam, and the slots may be disposed to link and drive two doors together without an increase in size of the cam.

Figure 12:
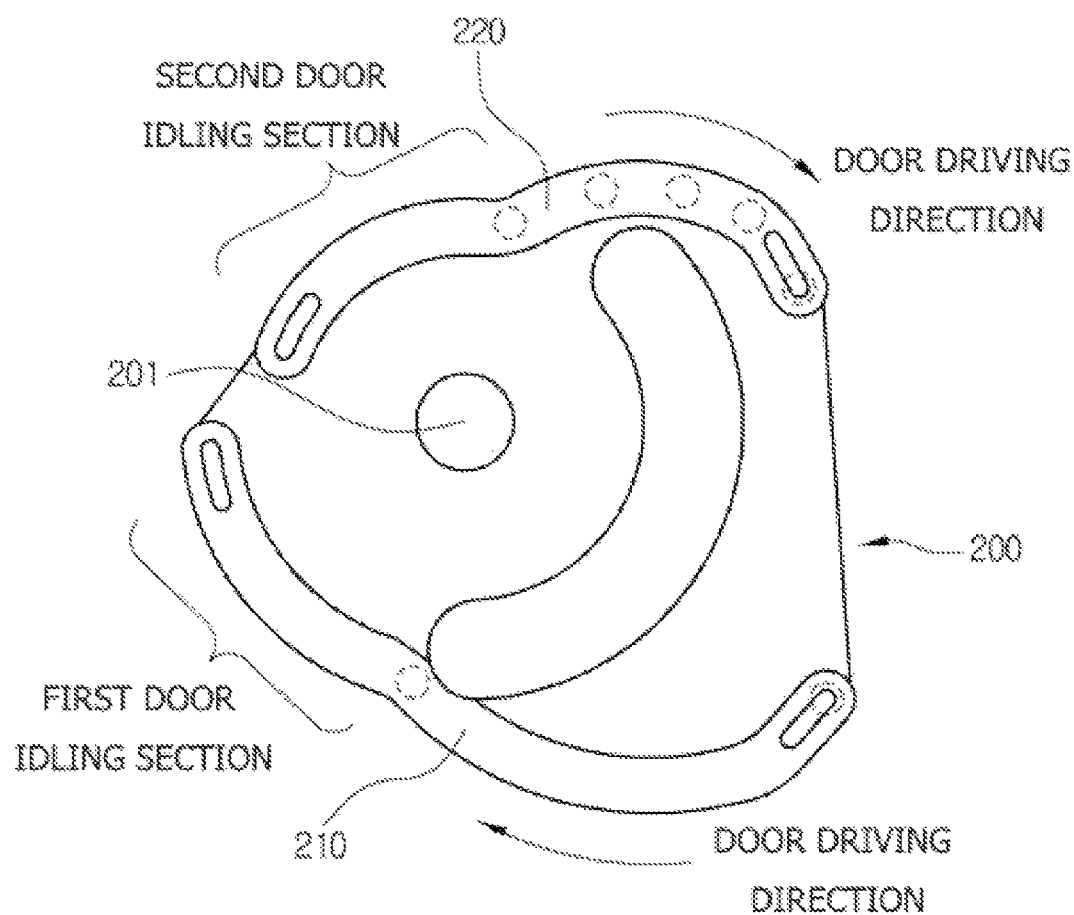
FIG. 12 is a front view illustrating a cam according to a modified embodiment of the present invention.

In this case, as shown in FIG. 3, the first slot 210 may be disposed to partially overlap the second slot 220. Meanwhile, FIG. 12 is a front view illustrating a cam according to a modified embodiment of the present invention. Referring to FIG. 12, the first slot 210 and the second slot 220 may be spaced a predetermined distance to face each other without an overlapping section. Even in the embodiment of FIG. 12, the driving section A1 of the first door, the idling section A2 of the first door, the idling section A3 of the second door, and the driving section A4 of the second door are sequentially and consecutively disposed.

Further, FIGS. 8 to 11 are cross-sectional views illustrating operational modes of the blower unit of an air conditioner for a vehicle according to one embodiment of the present invention.

Referring to FIGS. 8 to 11, the first door 140 is on-off adjusted to open or close a part of the external air inlet 112 and the entirety of the internal air inlet 111. The second door 150 is multistage adjusted to open the remaining part of the external air inlet 112.

Figure 8:
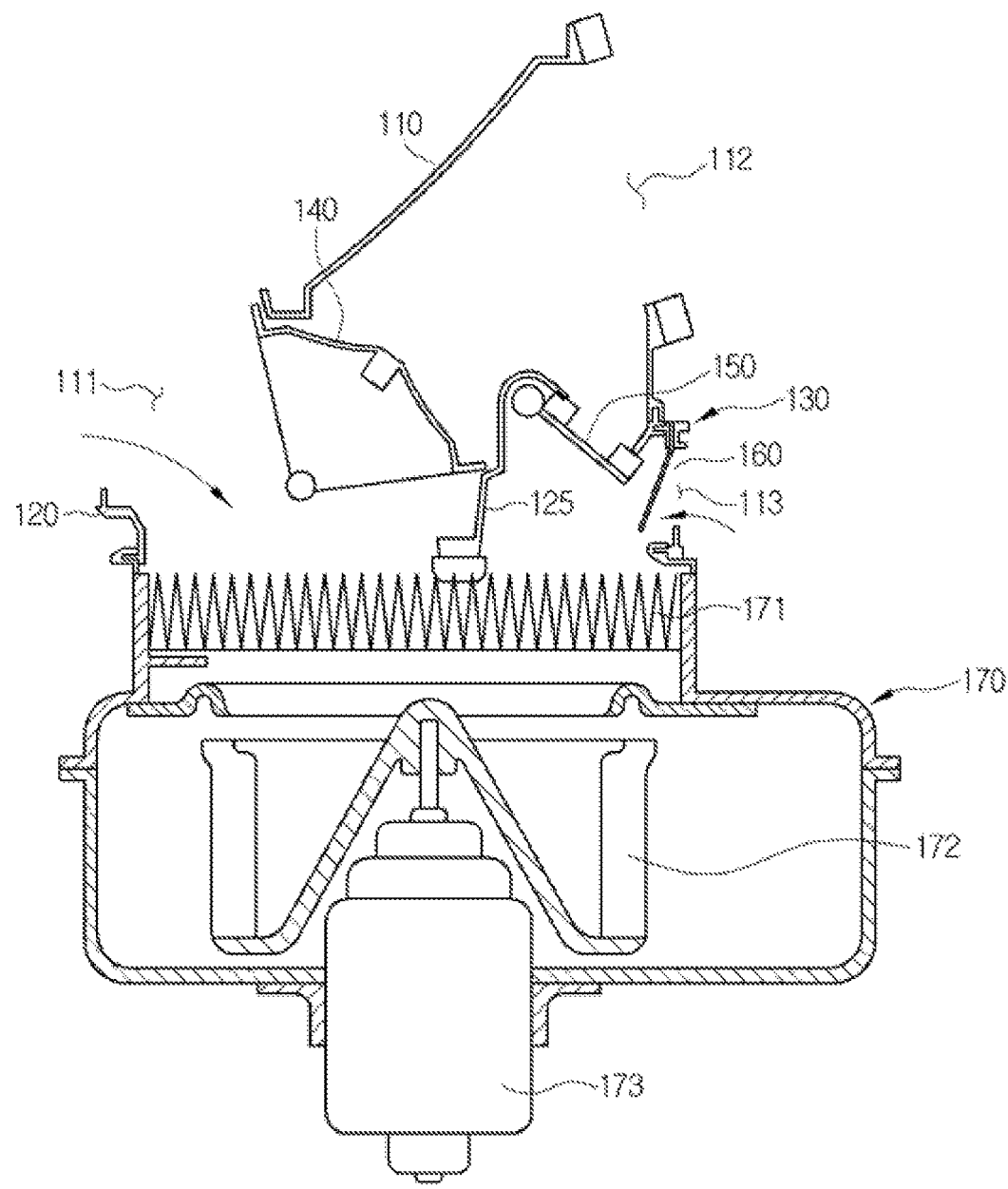
FIGS. 8 to 11 are cross-sectional views illustrating operational modes of the blower unit of an air conditioner for a vehicle according to one embodiment of the present invention.

Referring to FIG. 8, in a 100% internal air mode, the first door 140 closes an external air introduction path and opens the internal air inlet 111, and the second door 150 closes an external air introduction path. The internal air is introduced into the intake duct 130 through the internal air inlet 111 and the auxiliary internal air inlet 113. The 100% internal air mode may be operated during a normal time or when an internal air button is selected, and in this mode, 100% of the internal air is introduced, and 0% of external air is introduced.

Figure 9:
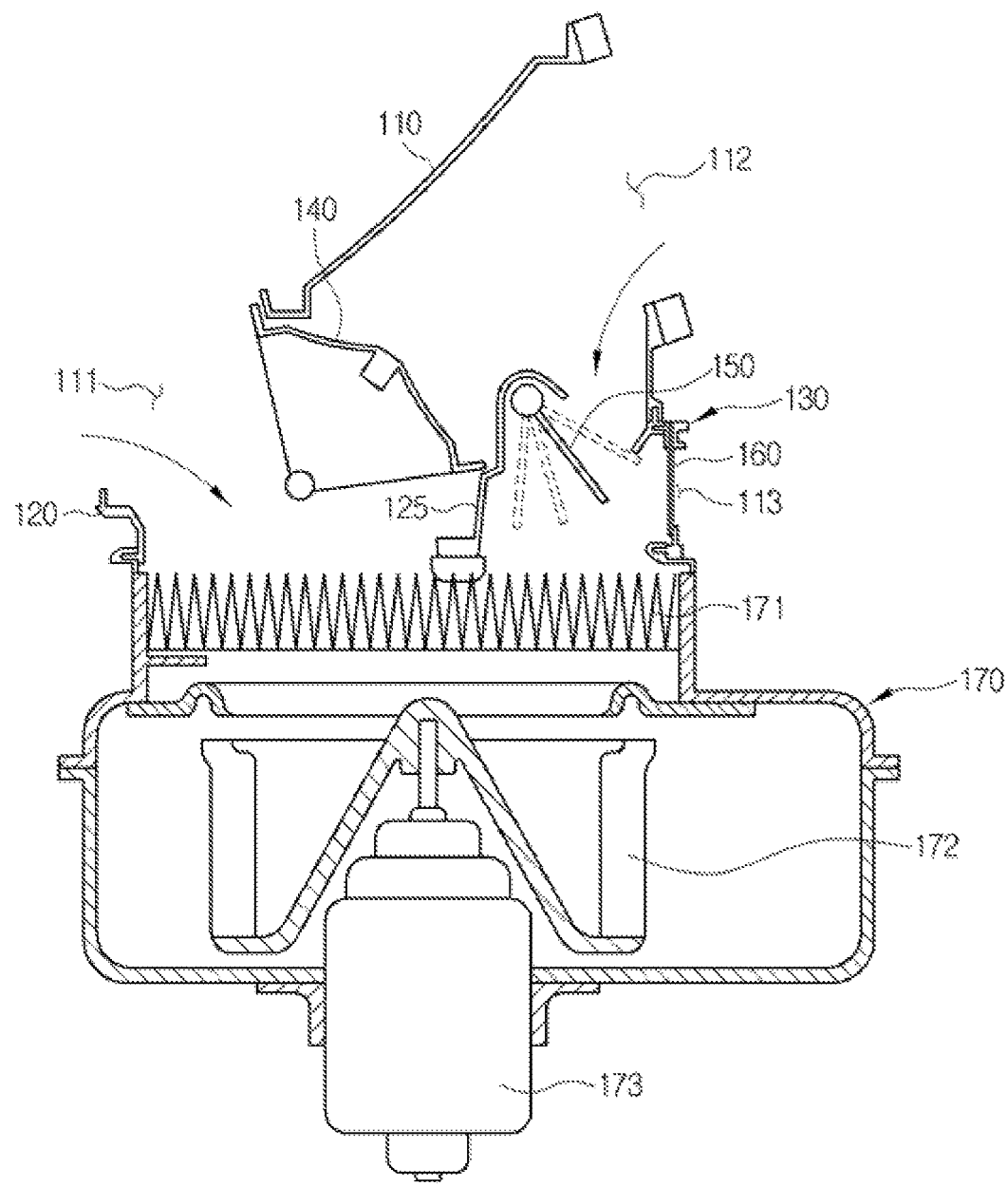

Referring to FIG. 9, in an internal/external air converting mode, the first door 140 closes the external air introduction path and opens the internal air inlet 111, and the second door 150 opens the external air introduction path in stages as shown by a solid line and a dotted line. The internal air is introduced into the intake duct 130 through the internal air inlet 111 and the auxiliary internal air inlet 113, and the external air is introduced into the intake duct 130 through the external air inlet 112. The external/internal air converting mode may be operated for adjustment of ADS, carbon oxide ($CO_2$), or the like when an external air button is selected, and in this mode, 100% of internal air is introduced, and external air may be introduced in stages, for example, 10%, 15%, or 25%.

Figure 10:
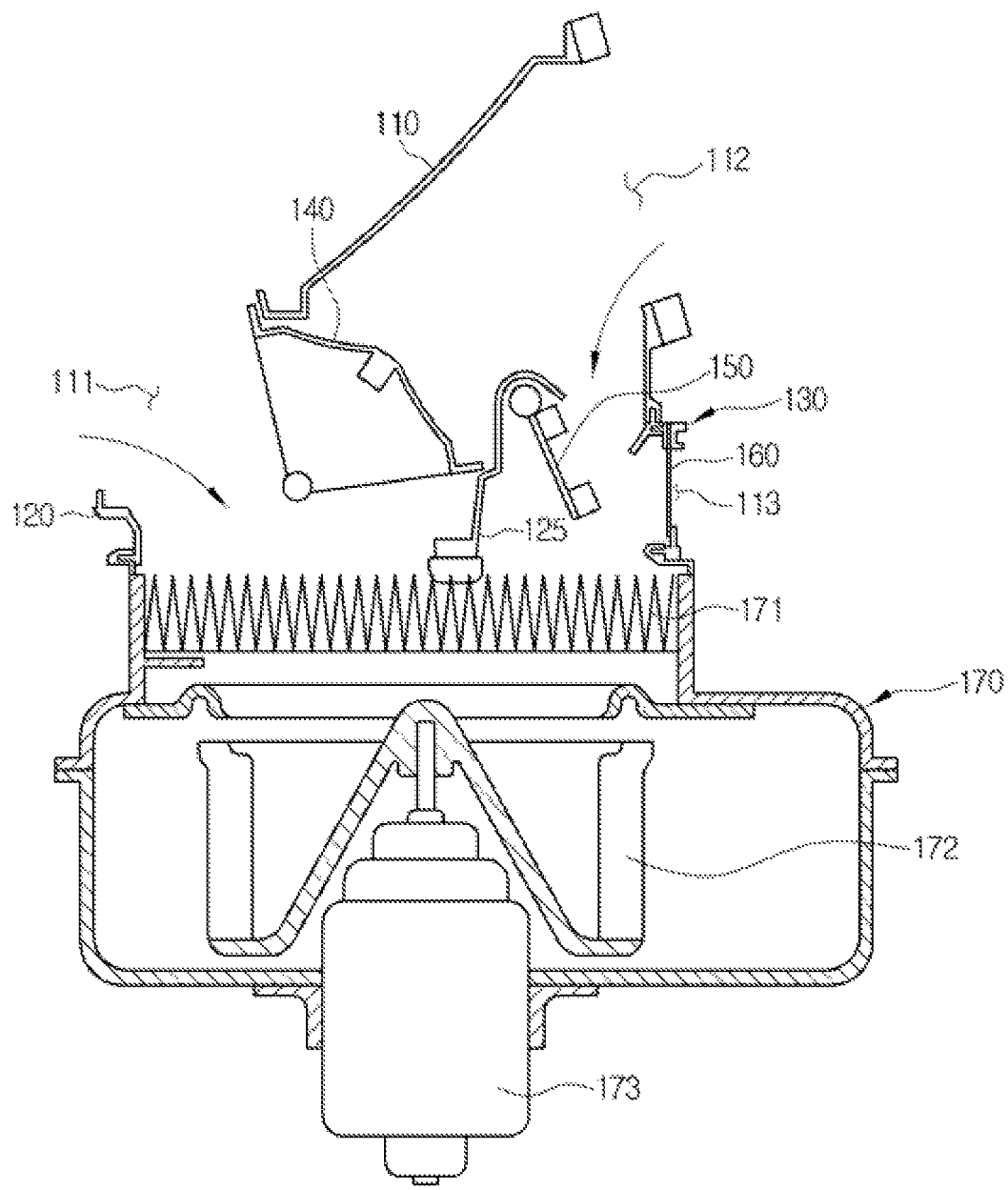

Referring to FIG. 10, in an internal air/maximum external air mode, the first door 140 closes the external air introduction path and opens the internal air inlet 111, and the second door 150 maximally opens the external air introduction path. The internal air is introduced into the intake duct 130 through the internal air inlet 111 and the auxiliary internal air inlet 113, and the external air is partially introduced into the intake duct 130 through the external air inlet 112. The internal air/maximum external air mode may be operated for adjustment of ADS, $CO_2$, or the like when the external air button is selected. In this mode, 100% of the internal air is introduced, and, for example, up to about 40% of the external air may be introduced.

Figure 11:
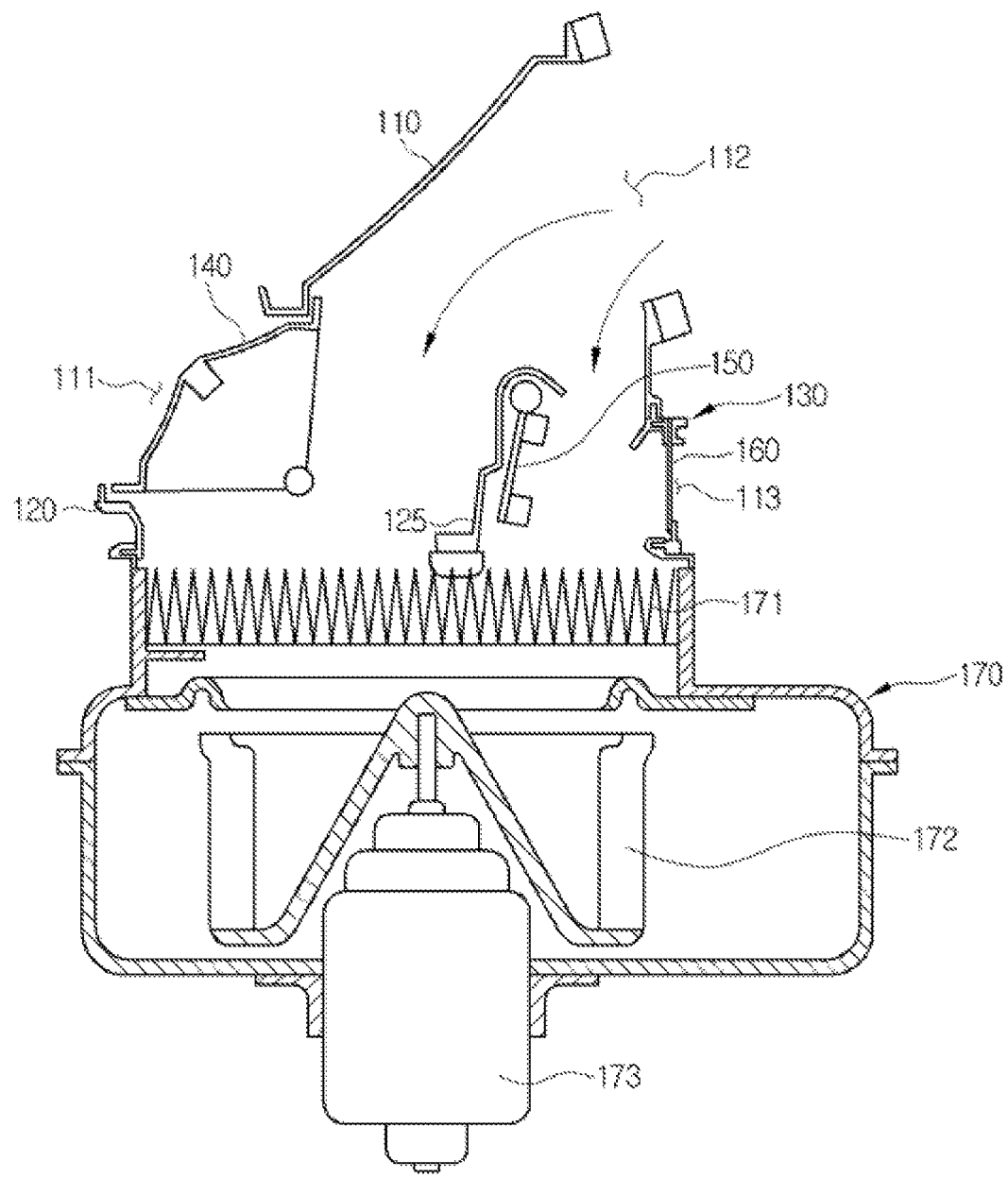

Referring to FIG. 11, in an external air mode, the first door 140 closes the internal air inlet 111 and opens the external air introduction path, and the second door 150 opens the external air introduction path. A part of the external air introduced through the external air inlet 112 is introduced into a first door 140 with respect to the partition wall 125, and the rest of the external air is introduced into a second door 150. The external air mode may be operated when a deep mode is selected, and in this mode, 0% of internal air is introduced, and 100% of external air is introduced.

Hereinafter, a blower unit of an air conditioner for a vehicle according to another embodiment of the present invention will be described.

The same reference numerals as those in FIGS. 1 to 12 have the same functions. Descriptions of elements having the same reference numerals will be omitted.

FIGS. 13 to 20 illustrate a structure of a modified intake duct of the blower unit for a vehicle.

Figure 13:
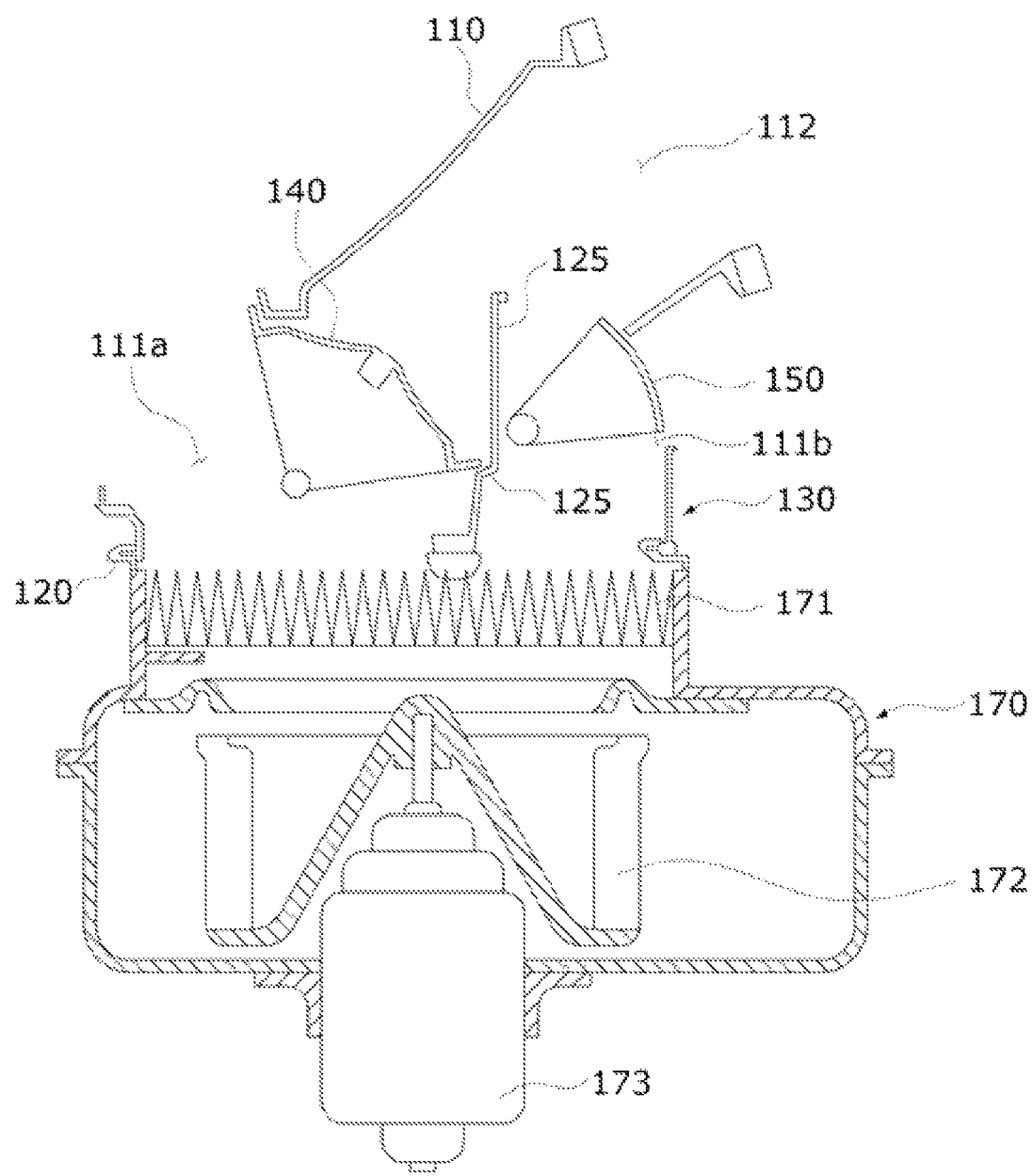
FIG. 13 is a cross-sectional view illustrating a blower unit of an air conditioner for a vehicle according to another embodiment of the present invention.

FIG. 13 is a cross-sectional view illustrating a blower unit of an air conditioner for a vehicle according to another embodiment of the present invention.

Referring to FIG. 13, an intake duct 130 may include a first internal air inlet 111a and a second internal air inlet 111b through which internal air is introduced and an external air inlet 112 through which external air is introduced.

In this case, the first door 140 may adjust an opening amount of a part of the external air inlet 112 and an opening amount of the first internal air inlet 111a. The second door 150 may adjust an opening amount of the remaining part of the external air inlet 112 and an opening amount of the second internal air inlet 111b.

Unlike the above-described embodiments of the present invention, the second door 150 may simultaneously adjust the second internal air inlet 111b and the external air inlet 112. For example, since a surface of the second door 150 is curved, when the second door 150 is rotated, the second internal air inlet 111b is closed. The second door 150 may have an area large enough to close the second internal air inlet 111b and may be variously transformed without limitation in shape.

The inflow of external air may be precisely adjusted by a structure in which the second internal air inlet 111b is adjusted by the second door 150, wherein the second internal air inlet 111b is on behalf of the auxiliary internal air inlet 113 according still another embodiment of the present invention.

Further, the second internal air inlet 111b may be disposed at various positions in which the second internal air inlet 111b is opened or closed by the second door 150.

The first door 140 and the second door 150 are linked and driven together through the cam 200, and the cam 200 may include a first slot 210 and a second slot 220, wherein the first slot 210 guides a pin 301 of a first arm 300 connected to a rotating shaft of the first door 140 in a sliding manner, and the second slot 220 guides a pin 401 of a second arm 400 connected to a rotating shaft of the second door 150 in a sliding manner.

The first slot 210 may be divided into a driving section A1 and an idling section A2 of the first door 140, and the second slot 220 may be divided into an idling section A3 and a driving section A4 of the second door 150. In this case, curvatures may be changed on a boundary between the driving section A1 and the idling section A2 of the first slot 210 and on a boundary between the idling section A3 and the driving section A4 of the second slot 220. Thus, when the cam 200 is driven, the first door 140 and the second door 150 are sequentially opened or closed.

Referring to FIGS. 4 and 13, a curvature r1 of the idling section A2 of the first slot 210 may be less than a curvature r2 of the idling section A3 of the second door 150. The curvatures of the first slot 210 and the second slot 220 compose an idling section in which a door is not rotated. In this case, the curvature of the idling section is relative to the size of door.

When considering of a position of the blower unit of an air conditioner for a vehicle, the size of the first internal air inlet 111a is greater than that of the second internal air inlet 111b, and doors that open or close the inlets are also different in size. In this case, a section in which the door idles is relative to a radius of rotation of the first door 140 and the second door 150, and thus the curvature r1 of the idling section A2 of the first slot 210 may be less than the curvature r2 of the idling section A3 of the second door 150.

Further, the amount of changes in the curvature r1 of the rotation section of the first slot 210 may be different from the curvature r2 of the rotation section of the second slot 220. Thus, when the second door is in the idling section, the first door is driven.

Figure 14:
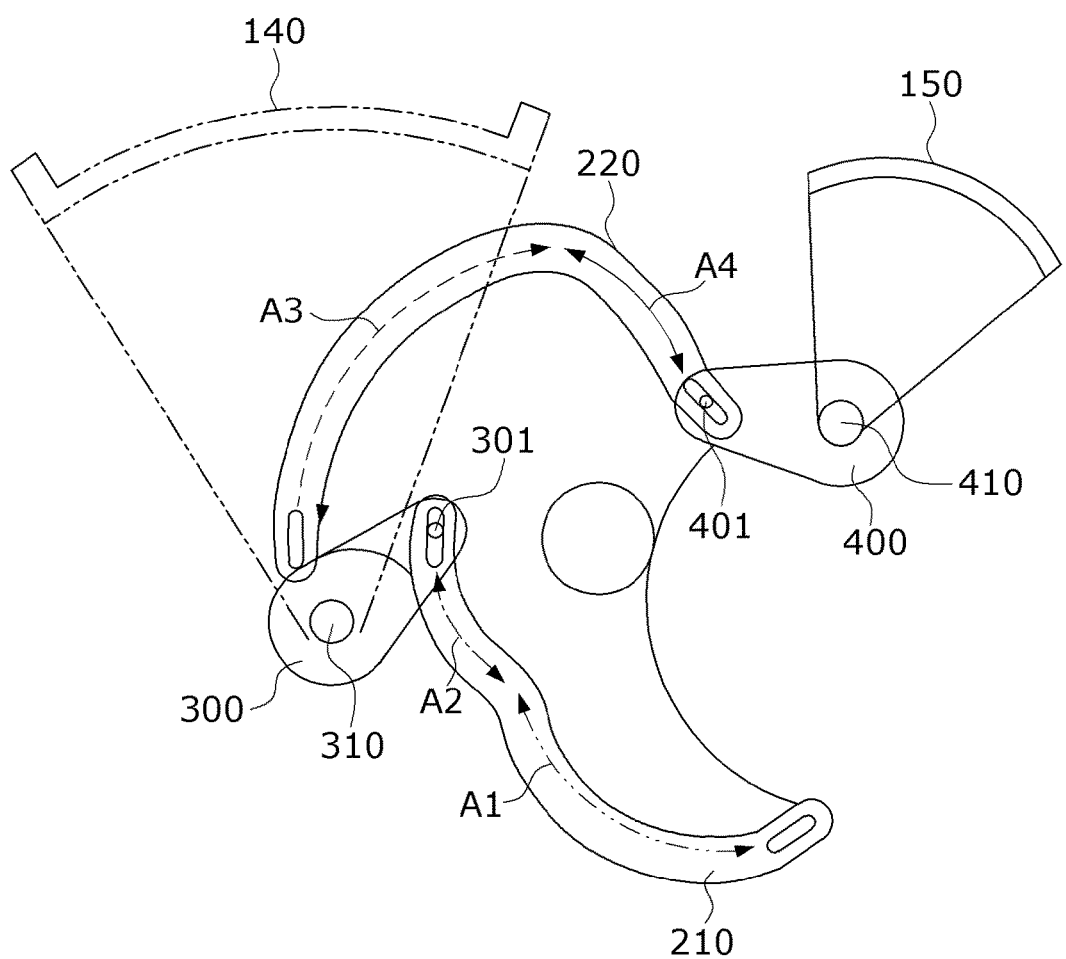
FIGS. 14 to 16 are views illustrating operation of a cam according to the FIG. 13.
Figure 15:
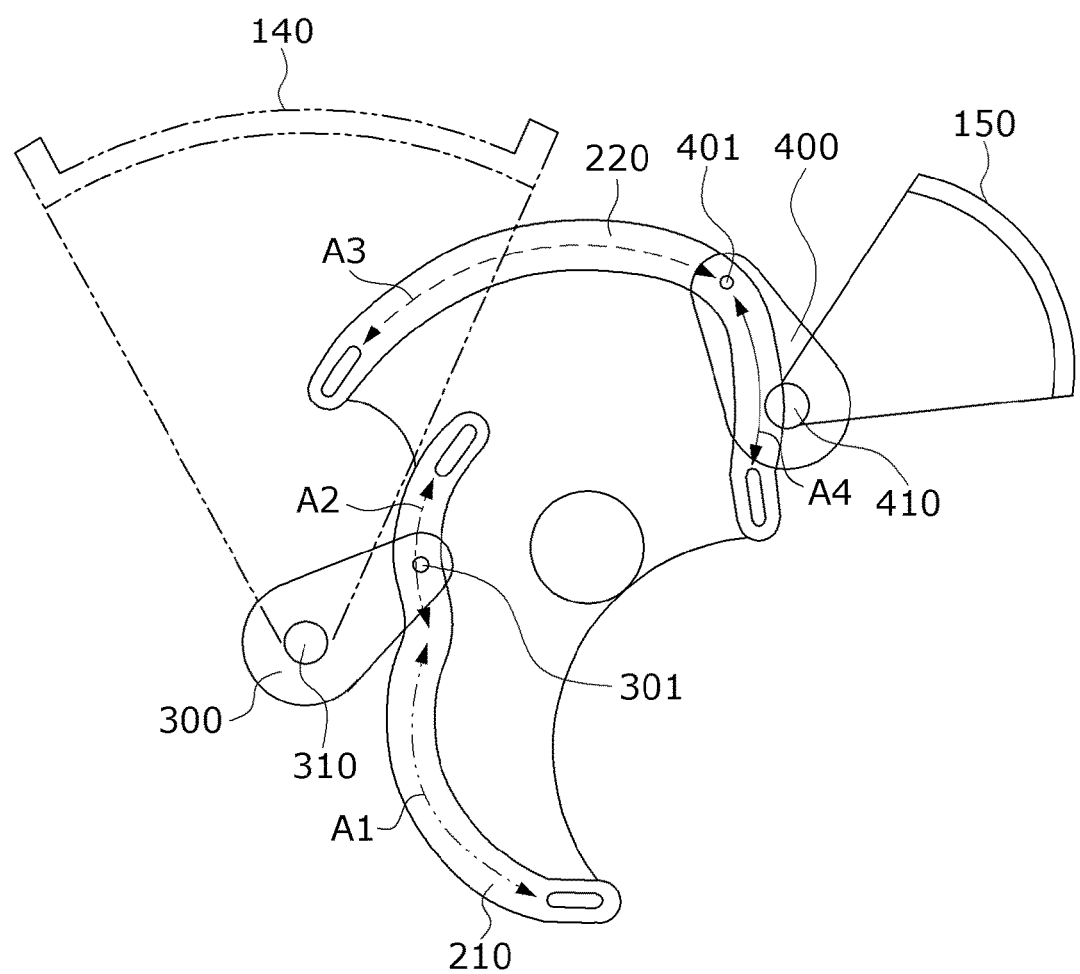
Figure 16:
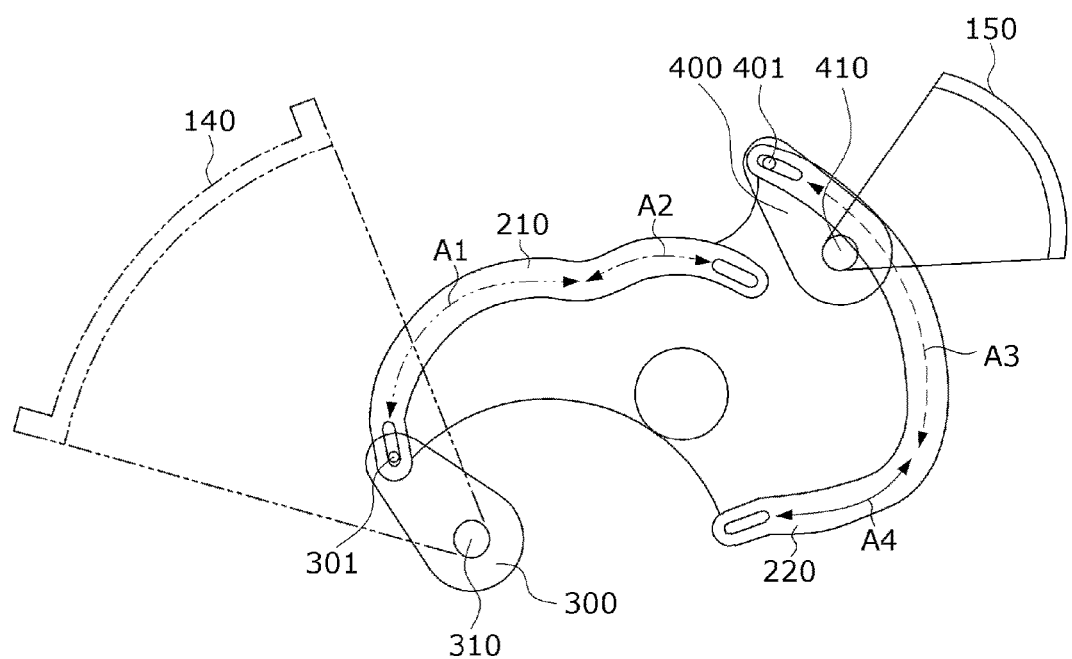

FIGS. 14 to 16 are views for describing operation of the cam in FIG. 13.

Referring to FIG. 4, the cam 200 driven in the blower unit of an air conditioner for a vehicle according to another embodiment of the present invention may be driven in the same manner as the above-described one embodiment. The curved sections in which the curvatures are changed are formed at a point a2 and a point a5. The driving section A1 of the first door is formed between a point a1 and the point a2, and the idling section A2 of the first door is formed between the point a2 and a point a3. The idling section A3 of the second door is formed between a point a4 and the point a5, and the driving section A4 of the second door is formed between the point a5 and a point a8.

The driving section A4 of the second door 150 is a section in which the second door 150 simultaneously opens a part of the external air inlet 112 in stages and closes the second internal air inlet 111b. In this section, curved sections in which curvatures are changed are formed at the points a5, a6, and a7, and the second door 150 may be adjusted to open or close the inlets in stages, and multi-stage adjustment of the door can be effectively performed.

Referring to FIGS. 4 and 14, the pin 301 of the first arm 300 is positioned at the point a3 of the first slot 210, and the first door 140 is in a state in which the first door 140 is maximally rotated in a clockwise direction, that is, a state in which a part of the external air inlet 112 is closed. The pin 401 of the second arm 400 is positioned at the point a8 of the second slot 220, and the second door 150 is in a state in which the second door 150 is maximally rotated in a counterclockwise direction, that is, a state in which the remaining part of the external air inlet 112 is closed.

Referring to FIGS. 4 and 15, in a state of FIG. 15, when the cam 200 rotates about the rotating shaft 201 at a predetermined angle in a clockwise direction, the pin 301 of the first arm 300 slides along the first slot 210. In the section that is the idling section A2 of the first door, the first door 140 is not rotated. The pin 401 of the second arm 400 slides along the second slot 220. In the section that is the driving section A4 of the second door, the second door 150 is rotated at the points a7 and a6 in stages in a clockwise direction.

Referring to FIGS. 4 and 16, from the state of FIG. 15, the cam 200 rotates about the rotating shaft 201, the pin 301 of the first arm slides along the first slot 210. In the section that is the driving section A1 of the first door 140, the first door 140 is rotated in a counterclockwise direction to close the first internal air inlet 111a. The pin 401 of the second arm 400 slides along the second slot 220. The section that is the idling section A3 of the second door 150, the second door 150 is not rotated.

Further, the first slot 210 and the second slot 220 extend along a perimeter of an edge of the cam 200, and the driving section A1 of the first door, the idling section A2 of the first door, the idling section A3 of the second door, and the driving section A4 of the second door are sequentially and consecutively disposed. Due to the configuration, arrangement of the slots is optimized within a limited size range of the cam 200, and the slots may be disposed to link and drive two doors together without an increase in size of cam.

FIGS. 17 to 20 are cross-sectional views illustrating operational modes of a blower unit of the air conditioner for a vehicle according to FIG. 13.

Figure 17:
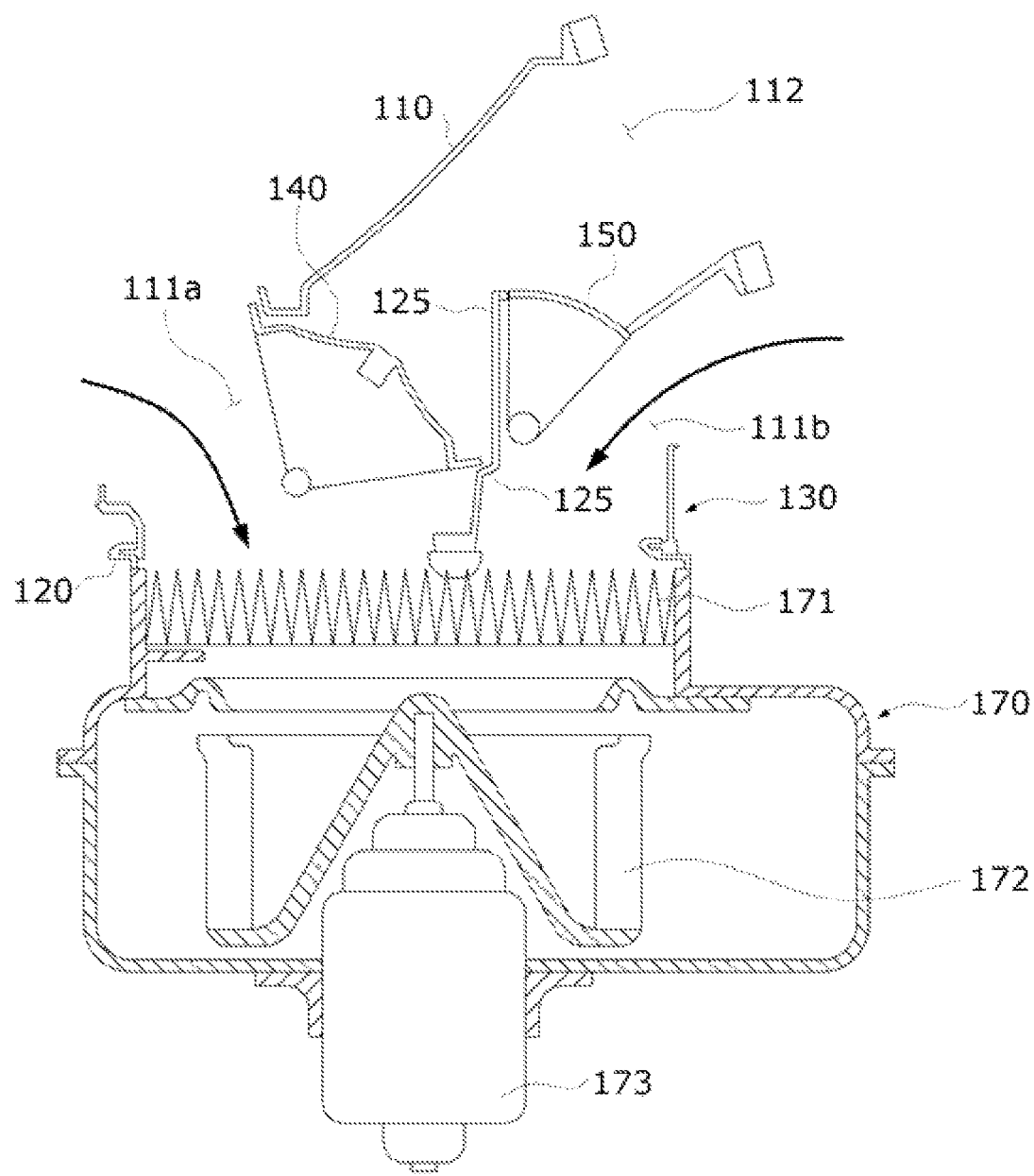
FIGS. 17 to 20 are cross-sectional views illustrating operational modes of the blower unit of the air conditioner for a vehicle according to FIG. 13.

Referring to FIG. 17, in the 100% internal air mode, the first door 140 closes the external air introduction path and opens the first internal air inlet 111a, and the second door 150 closes the external air introduction path by coming into contact with on region of the partition wall 125 and opens the second internal air inlet 111b. In this case, the shape of the partition wall 125 is not limited and may be variously transformed to a shape in which the second door 150 is rotated to come into contact with the second door 150 so as to block introduction of external air.

The internal air is introduced into the intake duct 130 through the first internal air inlet 111a and the second internal air inlet 111b. The 100% internal air mode may be operated during a normal time or when an internal air button is selected, and in this mode, 100% of the internal air is introduced, and 0% of external air is introduced.

Figure 18:
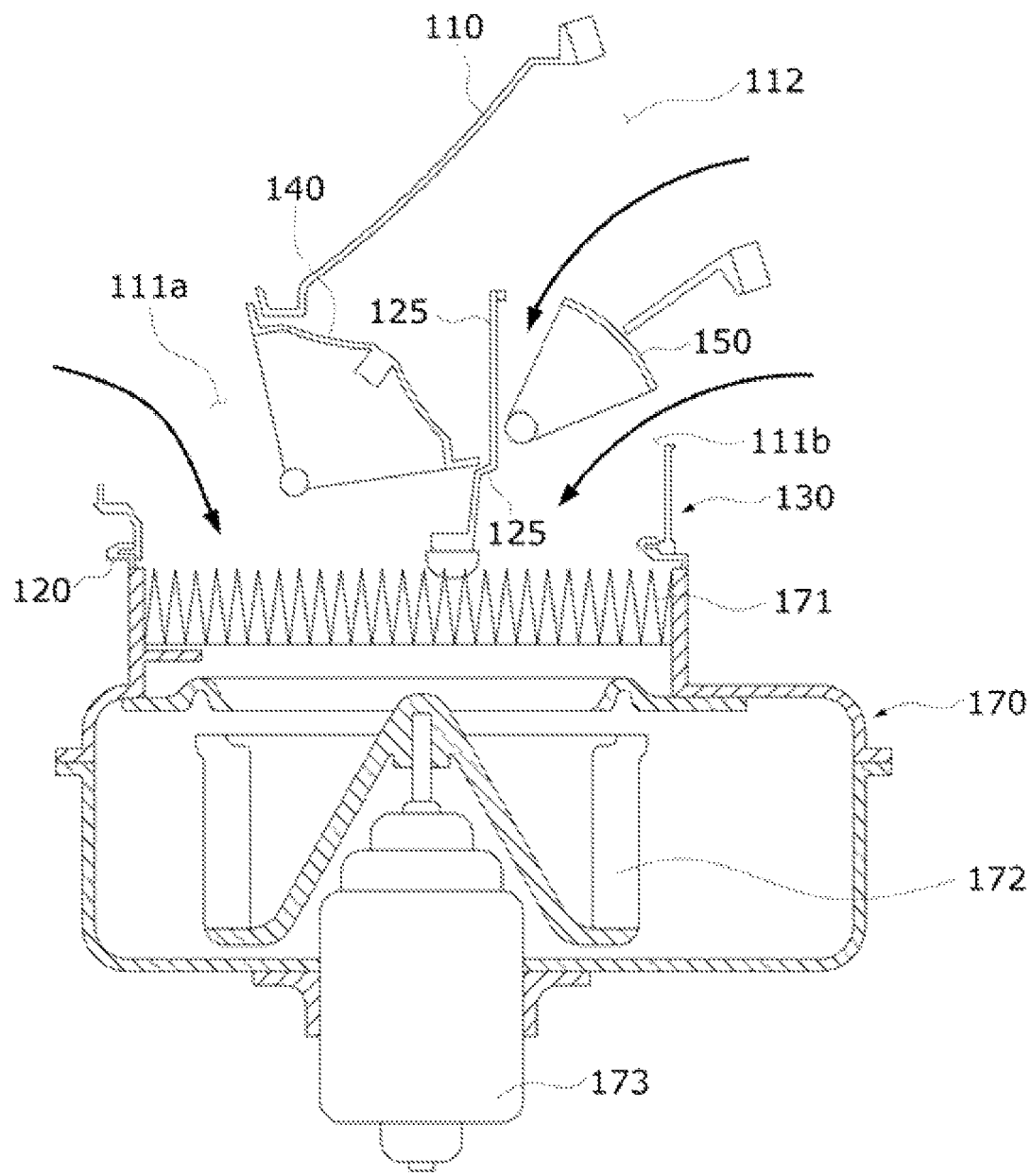

Referring to FIG. 18, in the internal air/external air converting mode, the first door 140 closes the external air introduction path and opens the internal air inlet 111, and the second door 150 opens the external air introduction path in stages as shown by a solid line and a dotted line. The internal air is introduced into the intake duct 130 through the first internal air inlet and the second internal air inlet, but the amount of the internal air introduced through the second internal air inlet is changed. The external air is introduced into the intake duct 130 through the external air inlet 112.

The internal air/external air converting mode may be operated for adjustment of ADS, $CO_2$, or the like when the external air button is selected, and in this mode, 100% of the internal air may be introduced, and the external air may be introduced in stages, for example, 10%, 15%, and 25% thereof.

Figure 19:
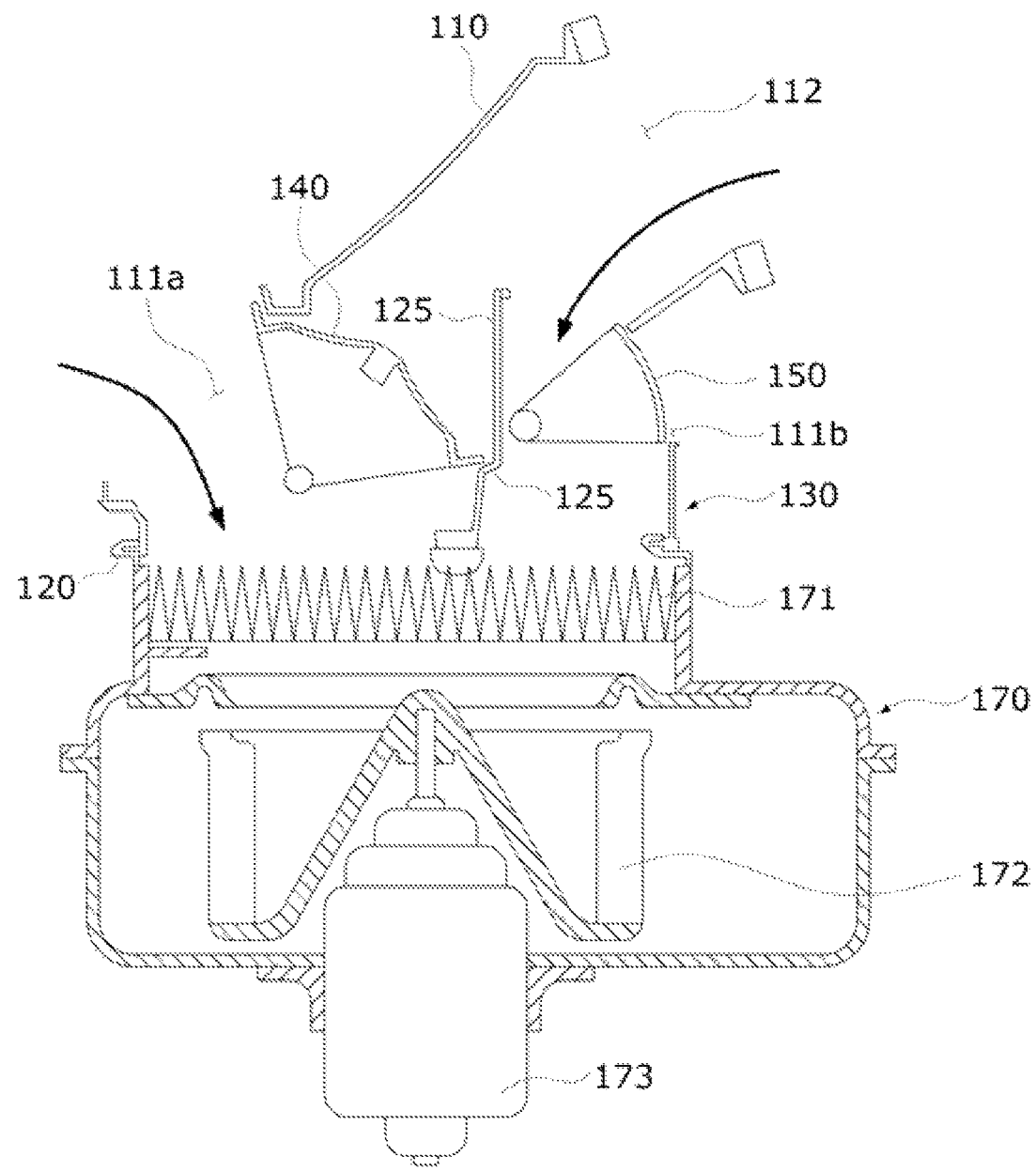

Referring to FIG. 19, in the internal air/maximum external air mode, the first door 140 closes the external air introduction path and opens the first internal air inlet 111a, and the second door 150 maximally opens the external air introduction path. The internal air is introduced into the intake duct 130 through the first internal air inlet 111a, and the external air is introduced into the intake duct 130 through the external air inlet 112. The internal air/maximum external air mode may be operated for adjustment of ADS, $CO_2$, or the like when the external air button is selected. In this mode, 100% of internal air is introduced, and, for example, up to about 40% of the external air may be introduced.

Figure 20:
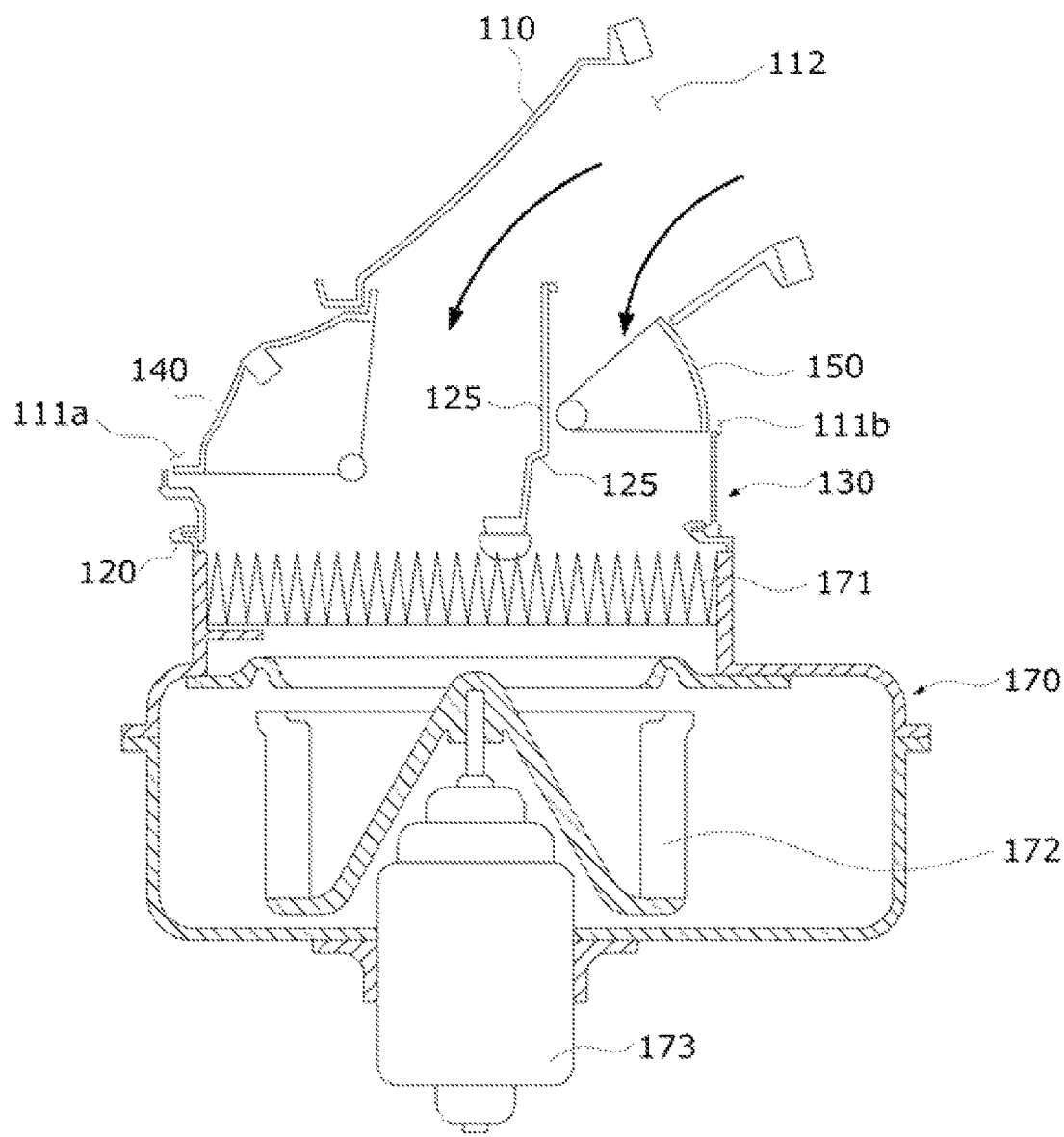

Referring to FIG. 20, in the external air mode, the first door 140 closes the first internal air inlet 111a and opens the external air introduction path, and the second door 150 closes the second internal air inlet 111b and opens the external air introduction path. A part of the external air introduced through the external air inlet 112 is introduced into a first door 140 with respect to the partition wall 125, and the remaining external air is introduced into a second door 150. The external air mode may be operated when a deep mode is selected. In this mode, 0% of the internal air is introduced, and 100% of the external air is introduced.

The blower unit of an air conditioner for a vehicle has been described in detail with reference to the accompanying drawings.

While the present invention has been particularly described with reference to the exemplary embodiments, it should be understood by those skilled in the art that various changes, modifications, and replacements in form and details may be made without departing from the spirit and scope of the present invention. Therefore, the exemplary embodiments and claims disclosed in the present invention should be considered in a descriptive sense only and not for purposes of limitation. Accordingly, the scope of the present invention is not limited by the embodiments and the accompanying drawings.

The scope of the present invention should be defined by the appended claims, and encompasses all modifications and equivalents that fall within the scope of the appended claims.

DESCRIPTION OF SYMBOLS

| | |
|---|---|
| 110: UPPER CASE | 111: INTERNAL AIR INLET |
| 111A: FIRST INTERNAL AIR INLET | |
| 111B: SECOND INTERNAL AIR INLET | |
| 112: EXTERNAL AIR INLET | |
| 113: AUXILIARY INTERNAL AIR INLET | |
| 120: LOWER CASE | 125: PARTITION WALL |
| 130: INTAKE DUCT | 140: FIRST DOOR |
| 150: SECOND DOOR | 160: THIRD DOOR |
| 170: BLOWER CASE | 171: AIR FILTER |
| 172: BLOWER WHEEL | 173: BLOWER MOTOR |
| 200: CAM | 201: ROTATING SHAFT |
| 210: FIRST SLOT | 220: SECOND SLOT |
| 300: FIRST ARM | 301, 401: PIN |
| 310, 410: ROTATING SHAFT | 400: SECOND ARM |

What is claimed:

1. A blower unit of an air conditioner for a vehicle which includes an intake duct including an internal air inlet through which internal air is introduced and an external air inlet through which external air is introduced, the blower unit comprising:
   a first door configured to adjust an opening amount of a part of the external air inlet and an opening amount of the internal air inlet;
   a second door configured to adjust an opening amount of a remaining part of the external air inlet, and
   a cam configured to drive the first door linked with the second door;
   wherein the first door and the second door are linked and driven together;
   wherein the cam includes a first slot configured to guide a pin of a first arm connected to a rotating shaft of the first door in a sliding manner and a second slot configured to guide a pin of a second arm connected to a rotating shaft of the second door in a sliding manner;
   wherein the first slot includes a driving section for the first door and an idling section for the first door;
   wherein the second slot includes an idling section for the second door and a driving section for the second door;
   wherein when the guide pin of the first arm is in the idling section for the first door, the first door is not rotatable;
   wherein when the guide pin of the second arm is in the driving section for the second door, the second door is rotatable;
   wherein when the guide pin of the first arm is in the driving section for the first door, the first door is rotatable, and
   wherein when the guide pin of the second arm is in the idling section for the second door, the second door is not rotatable.

2. The blower unit of claim 1, wherein, in the driving section for the first door, the first door forms an open-close state in which the internal air inlet and the part external air inlet are opened or closed.

3. The blower unit of claim 1, wherein, in the driving section for the second door, the second door forms a multistage adjustment state in which the remaining part of the external air inlet is opened or closed in stages.

4. The blower unit of claim 1, wherein the idling section for the first door and the idling section for the second door are disposed adjacent to each other, and
   the driving section for the first door and the driving section for the second door are disposed farthest apart from each other.

5. The blower unit of claim 1, wherein the driving section of for the first door and the idling section for the second door are linked and driven together, and
   the idling section for the first door and the driving section for the second door are linked and driven together.

6. The blower unit of claim 1, wherein the first slot and the second slot extend along a perimeter of an edge of the cam, and
   the driving section for the first door, the idling section for the first door, the idling section for the second door, and the driving section for the second door are sequentially disposed.

7. The blower unit of claim 1, wherein the first slot having a curved section formed on a boundary between the driving section and the idling section for the first door such that curvature of the first slot changes between the driving section and the idling section for the first door; and the second slot having a curved section formed on a boundary between the driving section and the idling section for the second door such that curvature of the second slot changes between the driving section and the idling section for the second door.

8. A blower unit of an air conditioner for a vehicle which includes an intake duct including a first internal air inlet and a second internal air inlet through which internal air is introduced and an external air inlet through which external air is introduced, the blower unit comprising:
   a first door configured to adjust an opening amount of a part of the external air inlet and an opening amount of the first internal air inlet; and
   a second door configured to adjust an opening amount of a remaining part of the external air inlet and an opening amount of the second internal air inlet,
   wherein the first door and the second door are linked and driven together;
   a cam having a first slot and a second slot;
   the first slot configured to guide a pin of a first arm connected to a rotating shaft of the first door in a sliding manner; and
   the second slot configured to guide a pin of a second arm connected to a rotating shaft of the second door in a sliding manner.

9. The blower unit of claim 8, wherein the first slot is divided into a driving section for the first door and an idling section for the first door, and
   the second slot is divided into an idling section for the first door and a driving section for the second door;
   wherein when the guide pin of the first arm is in the idling section for the first door, the first door is not rotatable;
   wherein when the guide pin of the second arm is in the driving section for the second door, the second door is rotatable;
   wherein when the guide pin of the first arm is in the driving section for the first door, the first door is rotatable, and
   wherein when the guide pin of the second arm is in the idling section for the second door, the second door is not rotatable.

10. The blower unit of claim 9, wherein the first slot having a curved section formed on a boundary between the driving section and the idling section for the first door such that curvature of the first slot changes between the driving section and the idling section for the first door; and the second slot having a curved section formed on a boundary between the driving section and the idling section for the second door such that curvature of the second slot changes between the driving section and the idling section for the second door.

11. The blower unit of claim 10, wherein an amount of change in curvature of the first slot is different from an amount of change in curvature of the second slot.

12. The blower unit of claim 10, wherein a curvature of the idling section of the first slot is less than a curvature of the idling section of the second slot.

13. The blower unit of claim 9, wherein, when the cam rotates, the first door and the second door are rotated together, and the first door and the second door open or close the first internal air inlet, the second internal air inlet, and the external air inlet to switch among an internal air mode, a semi-external air mode, and an external air mode.

* * * * *